United States Patent [19]
Vigil et al.

[11] Patent Number: 5,758,343
[45] Date of Patent: May 26, 1998

[54] APPARATUS AND METHOD FOR INTEGRATING MULTIPLE DELEGATE DIRECTORY SERVICE AGENTS

[75] Inventors: Mary Frances Vigil, La Jolla; Tak Fai Sze, San Diego; Gary Seller; Steven Lee Eggerman, both of Poway, all of Calif.

[73] Assignee: NCR Corporation, Dayton, Ohio

[21] Appl. No.: 569,544

[22] Filed: Dec. 8, 1995

[51] Int. Cl.[6] .................................................. G06F 17/30
[52] U.S. Cl. ................................................ 707/10; 707/104
[58] Field of Search ........................... 395/610; 707/10, 707/104

[56] References Cited

U.S. PATENT DOCUMENTS 5,678,045 10/1997 Bettels ............................... 707/200

*Primary Examiner*—Wayne Amsbury
*Attorney, Agent, or Firm*—Merchant, Gould, Smith, Edell, Welter & Schmidt

[57] ABSTRACT

A method and system for handling a highly scalable, X.500 directory solution is described. Management of information within the X.500 directory is divided among separate delegate directory service agent processes running on a single server. The server may have multiple processors implementing the separate delegate directory service agent processes. A user interface for managing such a system is also described.

18 Claims, 8 Drawing Sheets

APPARATUS AND METHOD FOR INTEGRATING MULTIPLE DELEGATE DIRECTORY SERVICE AGENTS

BACKGROUND OF INVENTION

1. Field of the Invention

The present invention relates generally to a highly scalable directory, and in particular to such a directory using multiple integrated delegate directory service agents.

2. Description of Related Art

Various directory systems have been used conventionally to organize electronically stored information, especially to facilitate subsequent retrieval by a user. The X.500 directory model has been implemented in various directory systems. X.500 model-based directory systems are typically used to support querying by human users. Such systems allow users to find information such as telephone numbers, addresses and other details of individuals and organizations in a convenient structure.

X.500 directories are characterized by their ability to efficiently handle large, highly distributed information. For example, a number of server based directory service agents (DSAs) may be connected to form a global X.500 directory. The individual directory service agents are maintained by different organizations throughout the world and are interconnected via a series of communication links.

An X.500 directory is often times distributed on an organizational basis. The directory is organized in a hierarchial structure having entries arranged in the shape of a tree, commonly referred to as a directory information tree (DIT). An exemplary directory information tree is illustrated in FIG. 13. In the illustrated example, entries for countries 11 and 12, and organizations of national significance 21, 22, and 23, appear towards the root 10 of the tree. Entries for individuals 41, 42, and 43 and small organizations 31, 32, and 33 appear towards the leaves of the tree. An entry which does not have any further entries depending therefrom is commonly referred to as a leaf entry.

Every entry in the directory information tree has a distinguished name that unambiguously identifies the particular entry. The distinguished name of a particular entry is derived from the structure of the directory information tree by combining the relative distinguished names from all entries higher up the tree. For example, entry 41 of the directory information tree illustrated in FIG. 13, has a distinguished name of the form:

cn=Timothy A. House, ou=Faculty and Staff, o=University of Michigan, c=U.S.

Information in the directory information tree is typically accessed using a directory user agent (DUA) connected to the directory service. The directory user agent assists a user in formulating queries, provides the required protocol for the queries and passes them to the directory to retrieve the information. The retrieved information is typically displayed to the user by the directory user agent.

In a conventional X.500 directory system, the OSI standards (Standard Reference Model for Open Systems Interconnection) do not define the directory user agent, but rather establish protocols that should be used by a directory user agent when communicating with such a directory. Typically, a directory user agent communicates with the directory using a directory access protocol (DAP) or another protocol fulfilling the same function such as the light directory access protocol (LDAP).

Accesses to the information within the directory information tree via a request from a directory user agent are typically handled by the directory service agent managing the directory information tree. The directory service agent may directly handle the request itself or may alteratively inquire of another directory service agent using the directory system protocol. The process of directing an inquiry to another directory service agent is generally referred to as chaining (i.e., the request is chained to another directory service agent).

One convenient form of a directory service agent is the QUIPU directory service agent which provides an environment for modifying the standardized directory services. A detailed description of an X.500 OSI directory service and QUIPU directory service agent technology is provided in ISODE Volume 5: *Administrator's Guide:* Directory Services (May 1994 ed.). While the strength of a QUIPU directory service agent includes its high distributivity, it encounters difficulties in handling large centralized directories. Thus, in order to migrate a large, centralized directory to a QUIPU-based X.500 directory, the legacy directory information needs to be split and disseminated to multiple directory service agent servers. Such an approach is expensive, both in terms of hardware and administrative resources. Moreover, such an approach does not solve the need to administer and store large amounts of non-distributed information.

A conventional QUIPU directory service agent readily supports directories having 40,000 entries using a single local directory service agent. In this approach, all directory information is loaded into the main memory of the directory service agent server when the directory service agent is started. This approach produces catastrophic memory errors when the number of entries in the directory exceeds 50,000. Thus, a conventional QUIPU directory service agent cannot be used for large centralized (non-distributed) directories.

In order to increase the capacity of QUIPU technology, a specialized delegate directory service agent may be implemented in connection with a QUIPU directory service agent. In this approach, a disk-based (rather than main memory-based) single delegate directory service agent process is installed on the server which implements the memory-based directory service agent. The memory-based directory service agent is constructed as a specialized adjacent directory service agent to which requests may be chained as needed. In this approach, when a request is chained to the delegate directory service agent, the delegate directory service agent accesses indexed files, which are created during a preprocessing stage, to serve the chained request. This use of a delegate directory service agent is described more fully in the above-referenced ISODE publication.

With the above approach, the use of a delegate directory service agent provides a successful implementation of a QUIPU implemented X.500 directory having approximately 100,000 entries. However, this approach also fails to perform adequately as the number of entries in the directory is increased to approximately 150,000. Thus, while the delegate directory service agent technology has doubled the capacity of the original QUIPU architecture, it still has a limited capacity (i.e., does not have a scalability sufficient to meet the needs of numerous enterprises having a need for larger localized directories). Thus, a large corporation having 300,000 employees could not use a single server to implement a centralized directory. Thus, in such systems, the directory information still must be split and disseminated onto multiple servers increasing the cost of implementing the directory and limiting the ability to have a large, non-distributed directory.

SUMMARY OF THE INVENTION

To overcome the limitations in the prior art described above, and to overcome other limitations that will become apparent upon reading and understanding the present specification, the present invention discloses a method and apparatus for providing an improved directory service which is highly scalable and which is able to handle large non-distributed directories.

The present invention may be implemented in the form of a directory service system for accessing information stored in an X.500 directory information tree. The system includes a first directory service agent coupled to receive a query from a directory user agent. The first directory service agent manages information in the root of the directory information tree. The system also includes multiple delegate directory service agents coupled to the first directory service agent. The delegate directory service agents each manage corresponding portions of the directory information tree beneath the root. In response to the query from the directory user agent, a request is chained to each of the delegate directory service agents. The response to the chained request from each of the delegate directory service agents is provided to the first directory service agent.

In one embodiment, each of the delegate directory service agents are implemented in parallel on corresponding parallel processors incorporated in a single server.

An object of the present invention is to provide a highly scalable directory service. Another object of the present invention is to provide a directory service which is able to handle large non-distributed directories. Still another object of the present invention is to provide an improved directory service using multiple delegate directory service agents. Another object of the invention is to provide a directory service where multiple delegate directory service agents are implemented on separate processors operating in parallel. Yet another object of the present invention is to provide a user interface which facilitates setup and management of the improved directory service.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE PREFERRED EMBODIMENT

In the following description of various embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
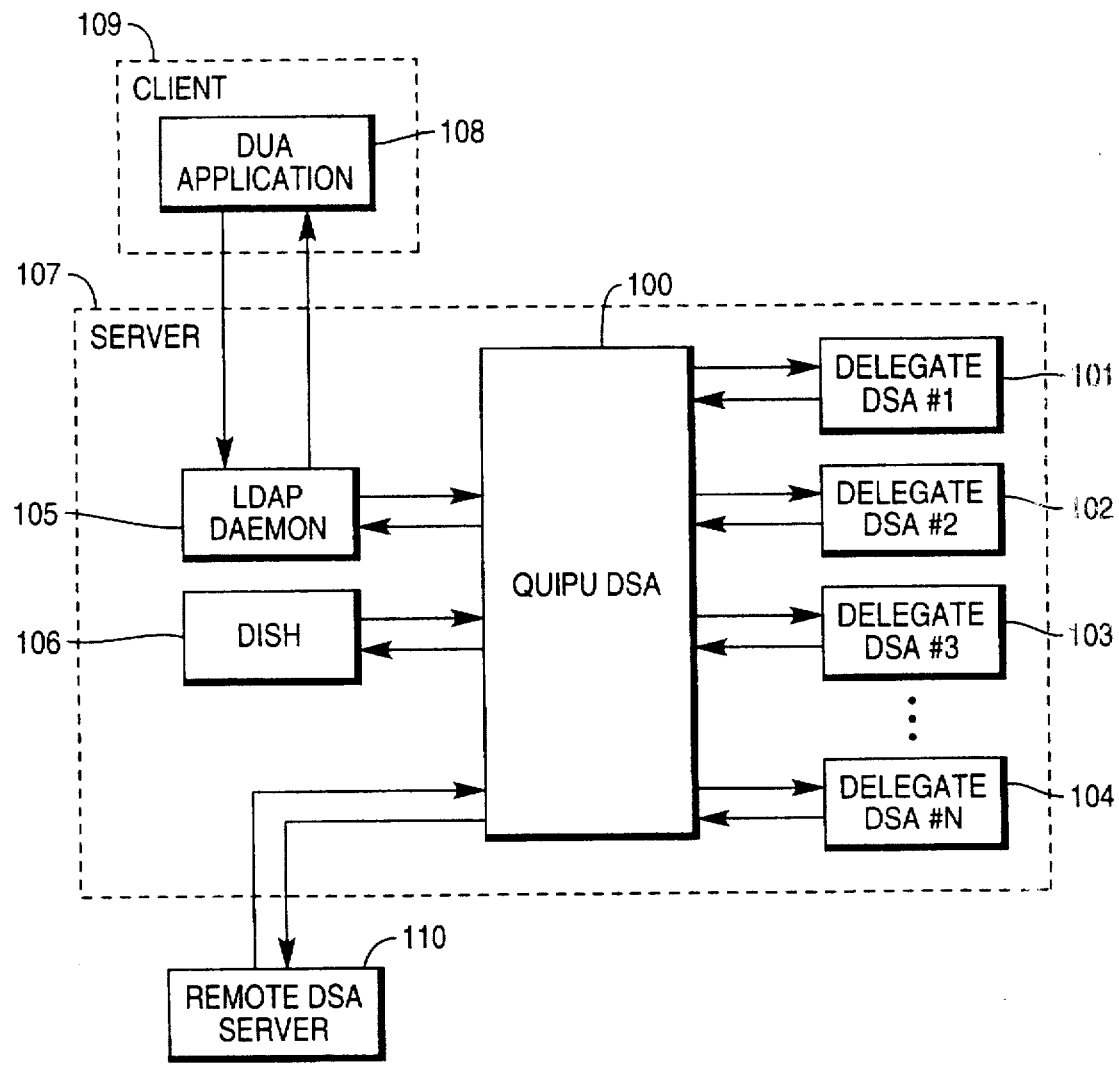
FIG. 1 illustrates a directory system in accordance with an embodiment of the invention.

FIG. 1 illustrates an exemplary embodiment of a directory service system. In accordance with this embodiment, a high degree of scalability is provided for a directory system. The system illustrated may be used to support a large, centralized X.500 directory. As illustrated in FIG. 1, management of information organized in an X.500 directory information tree is divided between a QUIPU directory service agent 100 and multiple delegate directory service agents 101, 102, 103, and 104, all of which are implemented in a server 107.

The QUIPU directory service agent 100 loads all of the information which it handles into the main memory of the server 107 when the directory service process is started. Information to be handled by the delegate directory service agents 101–104 may be stored, for example, in UNIX db formatted index files in a disk memory. The delegate directory service agents 101–104 read information from the UNIX db formatted index files as needed to service directory requests.

The QUIPU delegate service agent process 100 is defined in the illustrated example as a level one directory service agent. As such, the QUIPU directory service agent 100 is responsible for storing and managing information at the top (near the root) of the X.500 directory information tree. The lower branches of the directory information tree are maintained by the various delegate directory service agents 101–104. The QUIPU directory service agent 100 receives all directory requests initiated by a directory user agent and automatically chains the requests to each of the delegate directory service agents 101–104.

FIG. 1 also illustrates various directory user agents which may be used to request information from the directory service implemented on server 107. The directory user agents include a directory interface shell (DISH) application 106, a light directory access protocol (LDAP) daemon process 105 and a remote directory service agent server 110.

The DISH interface 106 provides server-based access to the directory and provides a powerful interface onto the directory to give a user access to the full directory access protocol. Such an interface is typically used to provide system administrators access to the system.

The LDAP daemon process 105 may be used to service directory requests originating from directory user agent (DUA) applications such as DUA application 108. Such a directory user agent application 108 typically resides in a client 109 connected to the directory via a local area network (LAN). The directory may also be accessed by a remotely located conventional directory service agent server 110. Communication with the conventional remote directory service agent server 110 is implemented using standard directory access protocols for communication between conventionally distributed directory service agent servers.

In operation, when a query is received by the QUIPU directory service agent 100, the request is chained to each delegate directory service agent 101–104 asynchronously. As the responses from the various delegate directory service agents 101–104 are received by the QUIPU directory service agent 100, they are combined to form a complete response to the user's query. The concatenated result is sent to the requester (i.e., to the DISH process 106 for display on the local server 107, to the LDAP daemon process 105 which provides the results to the DUA application 108, or to the remote directory service agent 110).

It is noted that there are no fixed limits to the number of delegate directory service agents 100–104 which can be implemented using the configuration of FIG. 1. The practical limit is the amount of information which can be handled by the host processor of server 107. In order to provide improved performance and nearly unlimited scalability, the server 107 may be implemented using a hardware platform incorporating multiple parallel processors. For ideal performance, each processor in the server 107 supports a process of one of the delegate directory service agents 101–104. For example, the S/3000 AT&T Server System, which is a multi-processing platform, can be used as the server 107. Such a system could support a very large number of delegate directory service agent processes and provide nearly unlimited directory scalability.

In the above example, multiple delegate directory service agents are provided in order to increase the number of entries which can be handled by a single server-based directory. The principles described can also be used to improve performance of a directory service of any size. For example, the performance of a relatively small directory may be improved by implementing the directory using multiple delegate directory service agents to handle relatively small portions of the directory. Each directory service agent process would be respectively executed on one of the multiple parallel processors.

Figure 2:
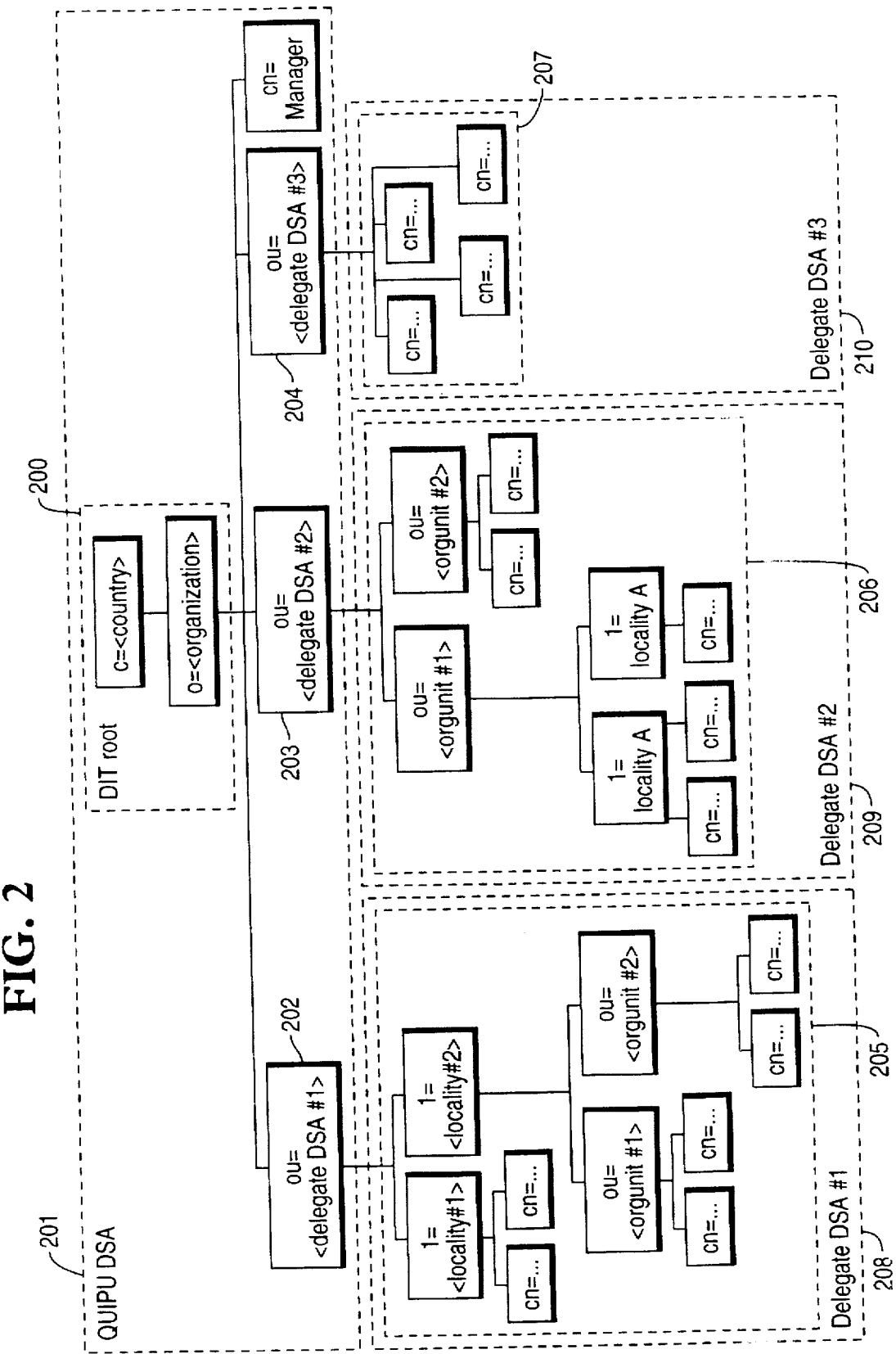
FIG. 2 illustrates a directory information tree in accordance with an embodiment of the present invention.

FIG. 2 illustrates an exemplary directory information tree which supports the use of multiple delegate directory service agent processes. As depicted in FIG. 2, the root 200 of the directory and the information contained in this portion of the directory information tree are managed by the QUIPU directory service agent process 201. The directory is automatically configured with the distinguished name "c=<country name>, o=<organization name>" where <country name> and <organization name> are provided by the administrator. Below the root 200, organizational unit non-leaf entries 202, 203, and 204 are automatically created for each delegate directory service agent specified by the administrator. These non-leaf entries 202, 203, and 204 define the delegate directory service agent processes and are managed by the QUIPU directory service agent 201.

Below the organizational unit nodes 202, 203, and 204, the administrator may create directory information tree branches 205, 206, and 207 that are managed by the specific delegate directory service agent processes 208, 209, and 210, respectively. In this manner, an administrator may efficiently divide a large localized directory into the multiple delegate directory service agent processes in order to efficiently handle the entries on a single server.

The illustrated system, may be administrated and implemented using standard open directory systems technologies with modifications to allow the administrator to set up and manage the multiple delegate directory service agents. For example, the AT&T open directory system, as described in "Open Directory Administrator Guide" D1-4765-A (July 1995), may be modified to provide administrative management utilities designed to facilitate the use of multiple delegate directory service agents.

FIGS. 3–12 depict an exemplary interface which may be incorporated into a system such as the AT&T open directory system to assist management of a directory implemented using multiple delegate directory service agents. The example also identifies the general types of tasks which would be carried out to set up a directory using multiple delegate directory service agents. The graphical user interface allows a directory administrator to define the multi-processing configuration in an intuitive manner without an understanding of the underlying configuration requirements of the QUIPU technologies used.

Figure 3:
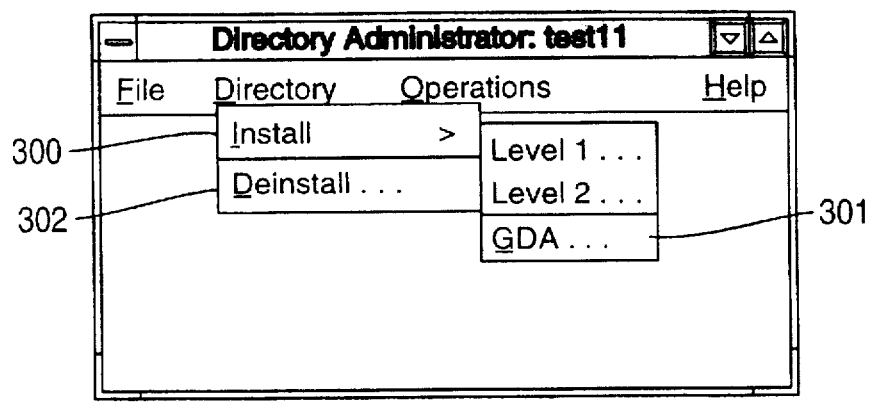
FIG. 3 illustrates a graphical user interface window in accordance with an embodiment of the present invention.

A first menu, as illustrated in FIG. 3, is displayed when the administration utility is invoked. The "Install" 300 and "GDA" 301 choices allow the administrator to add an organizational unit non-leaf entry to the directory information tree to define a delegate directory service agent. The "Deinstall" 302 choice removes the specified delegate directory service agent process and the associated branch of the directory information tree from the directory.

Figure 4:
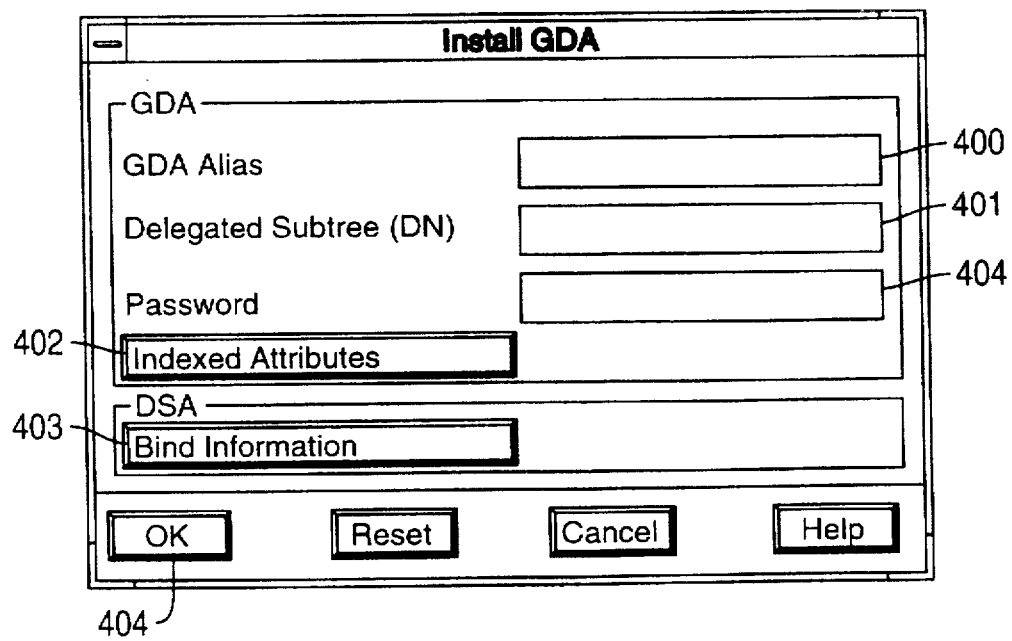
FIG. 4 illustrates another graphical user interface window in accordance with an embodiment of the present invention.

When the "Install" 300 and the "GDA" 301 choices are made to add a delegate directory service agent process to the configuration, the dialog box illustrated in FIG. 4 is presented. The "GDA Alias" 400, the distinguished name "DN" of the delegate subtree 404, and "Password" 401 can be entered directly into the input fields within this box. The "Indexed Attributes" button 402 and the "Bind Information" tree 403 can be used to display additional dialog boxes for specifying other configuration information. It is noted that an alias entry, such as the GDA alias 400, is an entry in the directory information tree which has its own distinguished name, but only points to another entry and does not hold full information for the entry.

Figure 5:
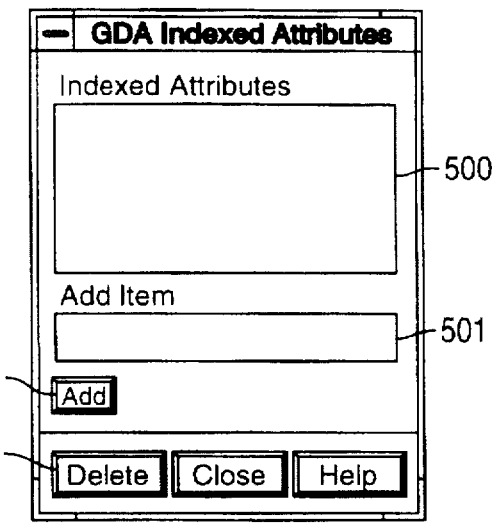
FIG. 5 illustrates still another graphical user interface window in accordance with an embodiment of the present invention.

Depressing the "Indexed Attributes" button 402, displays the dialog box shown in FIG. 5. New directory attributes can be added to the list of the index attributes, by typing the attribute name in the "Add Item" field 501 and depressing the "Add" button 502. As attributes are added to the list, they are displayed in the "Indexed Attributes" window 500. Attributes can be deleted from the index list by selecting the attribute name from the "Indexed Attributes" window 500 and depressing the "Delete" button 503.

Figure 6:
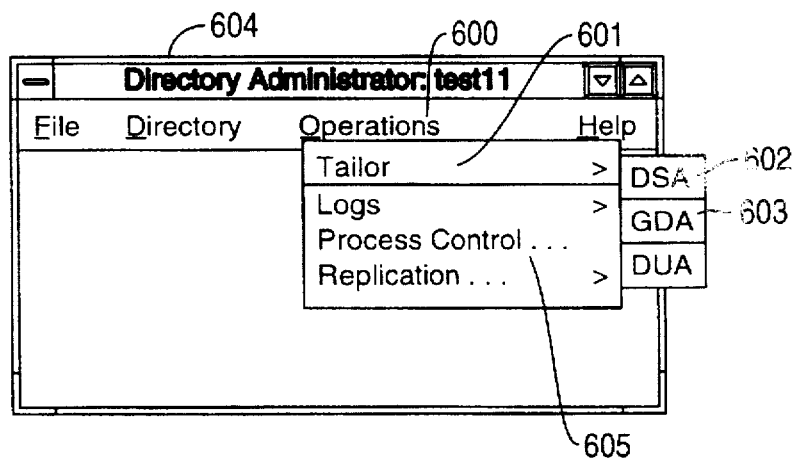
FIG. 6 illustrates a further graphical user interface window in accordance with an embodiment of the present invention.
Figure 7:
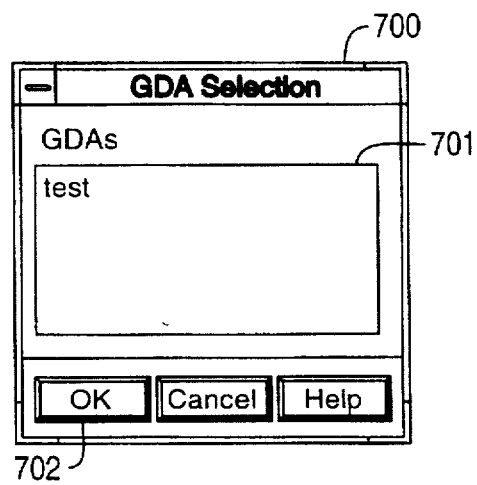
FIG. 7 illustrates another graphical user interface window in accordance with an embodiment of the present invention.

Additional configuration options are available through the "Operations" option of the main administrative menu as shown in FIG. 6. Depressing the operations menu option 600 results in a drop down menu with additional choices. The "Tailor" option 601 allows the administrator to choose configuration options for the QUIPU directory service agent 602 or a delegate directory service agent process 603. Specifying the GDA option 603 causes a separate menu to be displayed as shown in FIG. 7. Menu screen 700 allows the administrator to choose which delegate directory service agent configuration to tailor. The alias names of all installed delegate directory service agent processes are listed in the GDA's window 701. To choose a specified delegate directory service agent, the administrator highlights the appropriate alias name with the GDA window 701 and depresses the "OK" button 702.

Figure 8:
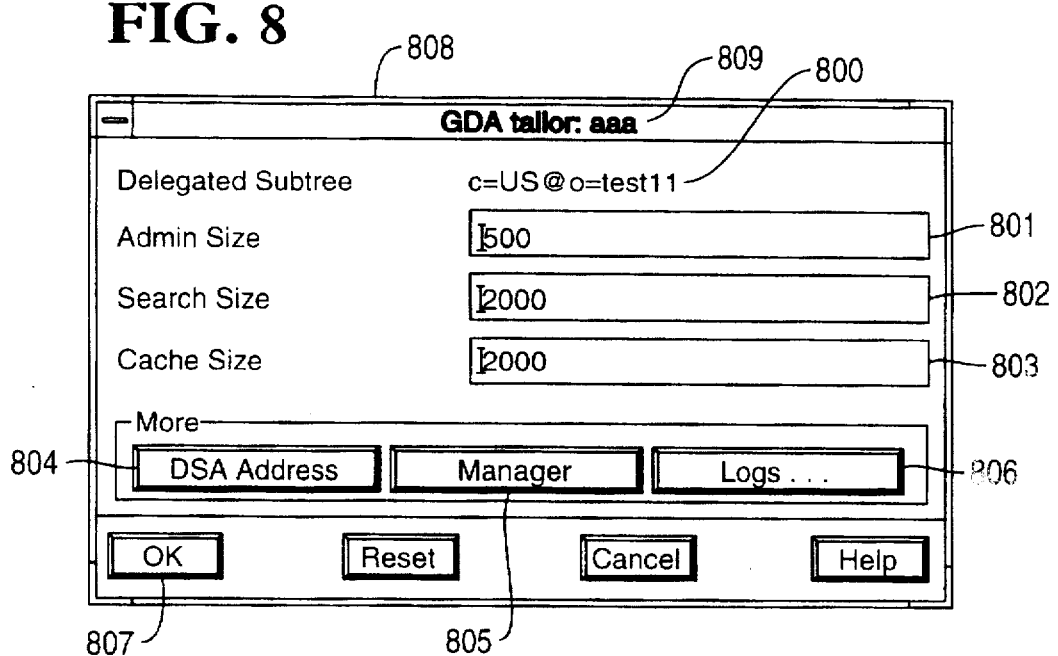
FIG. 8 also illustrates a graphical user interface window in accordance with an embodiment of the present invention.

The delegate directory service agent configuration tailor dialog box is shown in FIG. 8. The delegate directory service agent alias name 809 is displayed on the top of the screen. The distinguished name of the non-leaf node representing the delegate directory service agent 800 is also shown. Configurable size limitations can be set by entering values into three input fields 801, 802, and 803 within the dialog box. Additional configuration parameters can be set by depressing the "Directory Service Agent Address" button 804, the "Manager" button 805, and the "Logs" button 806. To save all the entered information the "OK" button 807 is depressed.

Figure 9:
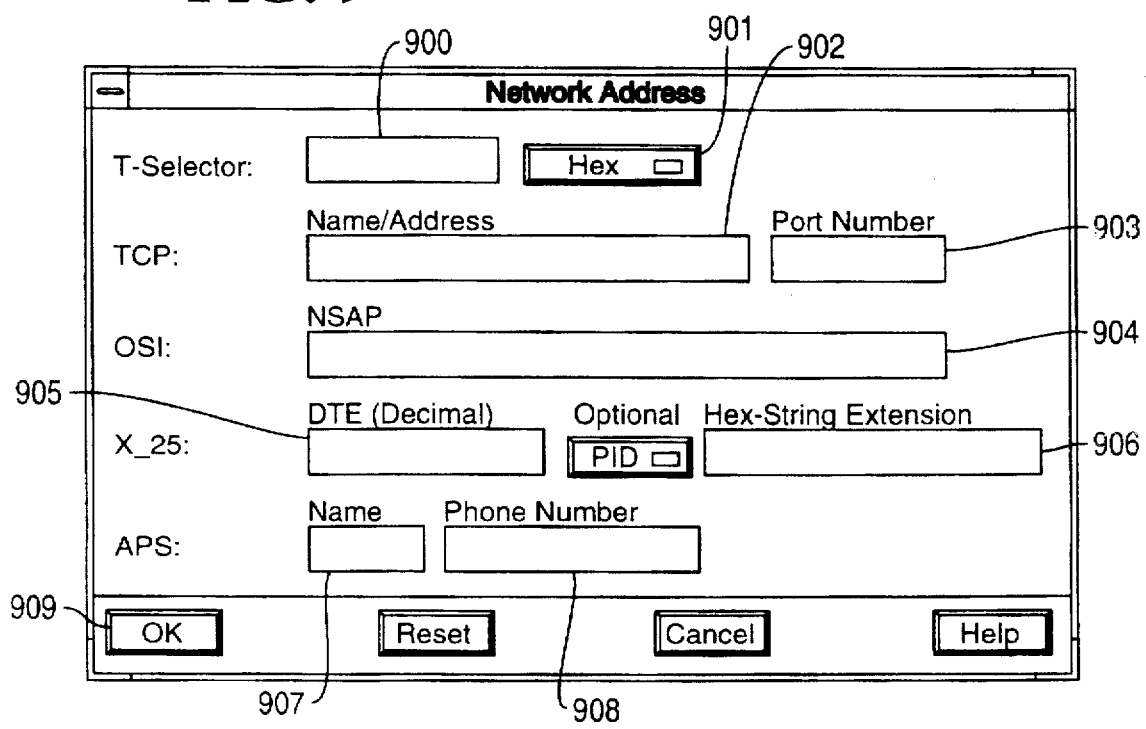
FIG. 9 illustrates another graphical user interface window in accordance with an embodiment of the present invention.

The dialog box shown in FIG. 9, is displayed as a result of choosing the "Directory Service Agent Address" button 804. A T-selector can be specified in the first field 900. A hexadecimal value can be entered by depressing the "HEX" button 901. For TCP/IP (Transmission Control Protocol/ Internet Protocol) configurations the name or address and a part number can be added in the input fields 902 and 903 on the second line of the dialog box. An OSI address is entered into the "NSAP" input field 904. Fields 905 and 906 are also provided to configured for X.25 addressing (i.e., the CCITT recommendation entitled "Interface between Data Terminal Equipment and Data Circuit Terminating Equipment for Terminals Operating in the Packet Mode and Connected to Public Data Networks by Dedicated Circuit"). APS (Asynchronous Protocol Specification) configuration information, specified in the "Name" 907 and the "Phone Number" 908 fields, are not applicable to delegate directory service agent configuration. Information is saved by depressing the "OK" button 909.

Figure 10:
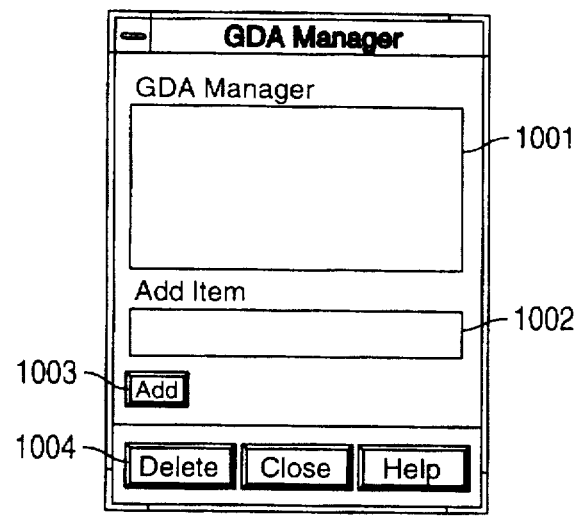
FIG. 10 illustrates still another graphical user interface window in accordance with an embodiment of the present invention.

Selecting the "Manager" button 805 from the "GDA Tailor" dialog box 808, results in the screen depicted in FIG. 10. The dialog box is used to specify which managers are granted special privileges to access the delegate directory information subtree. Manager names are entered in the "Add Item" input field 1002. The "Add" button 1003 is used to save the new item. Existing items are displayed in the "GDA Manager" window 1001. An item can be deleted by highlighting it in the "GDA Manager" window 1001 and depressing the "Delete" button 1004.

Figure 11:
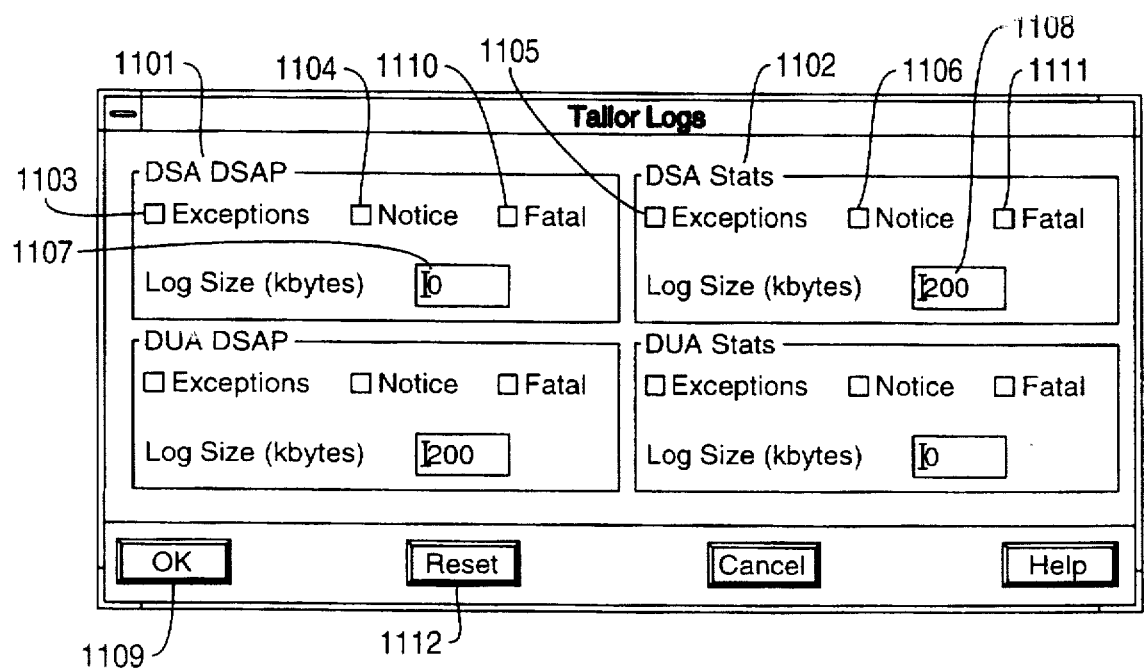
FIG. 11 illustrates another graphical user interface window in accordance with an embodiment of the present invention.

Selecting the "Logs" button 806 from the GDA tailor dialog box 808 causes the dialog box shown in FIG. 11 to be displayed. Controls are provided for the two separate logs maintained by the delegate directory service agent. The delegate directory service agent protocol trace options are displayed on the left hand of this screen 1101, while the statistic log options are displayed on the right 1102. The type of logging can be toggled by depressing the appropriate "Exceptions" buttons 1103 and 1105, "Notice" buttons 1104 and 1106, or "Fatal" buttons 1110, 1111. The maximum size of the log files can be specified in the "Log Size" fields 1107 and 1108. Log settings can be set to default values using the "Reset" button 1112. To save the log settings, the "OK" button 1109 is depressed.

Figure 12:
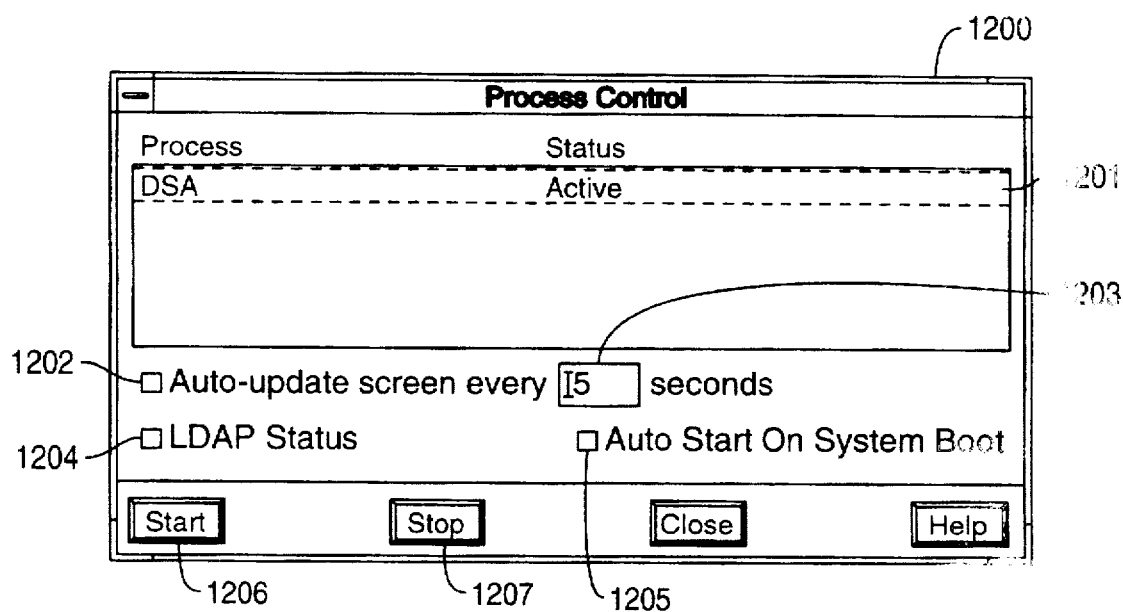
FIG. 12 illustrates a further graphical user interface window in accordance with an embodiment of the present invention.
Figure 13:
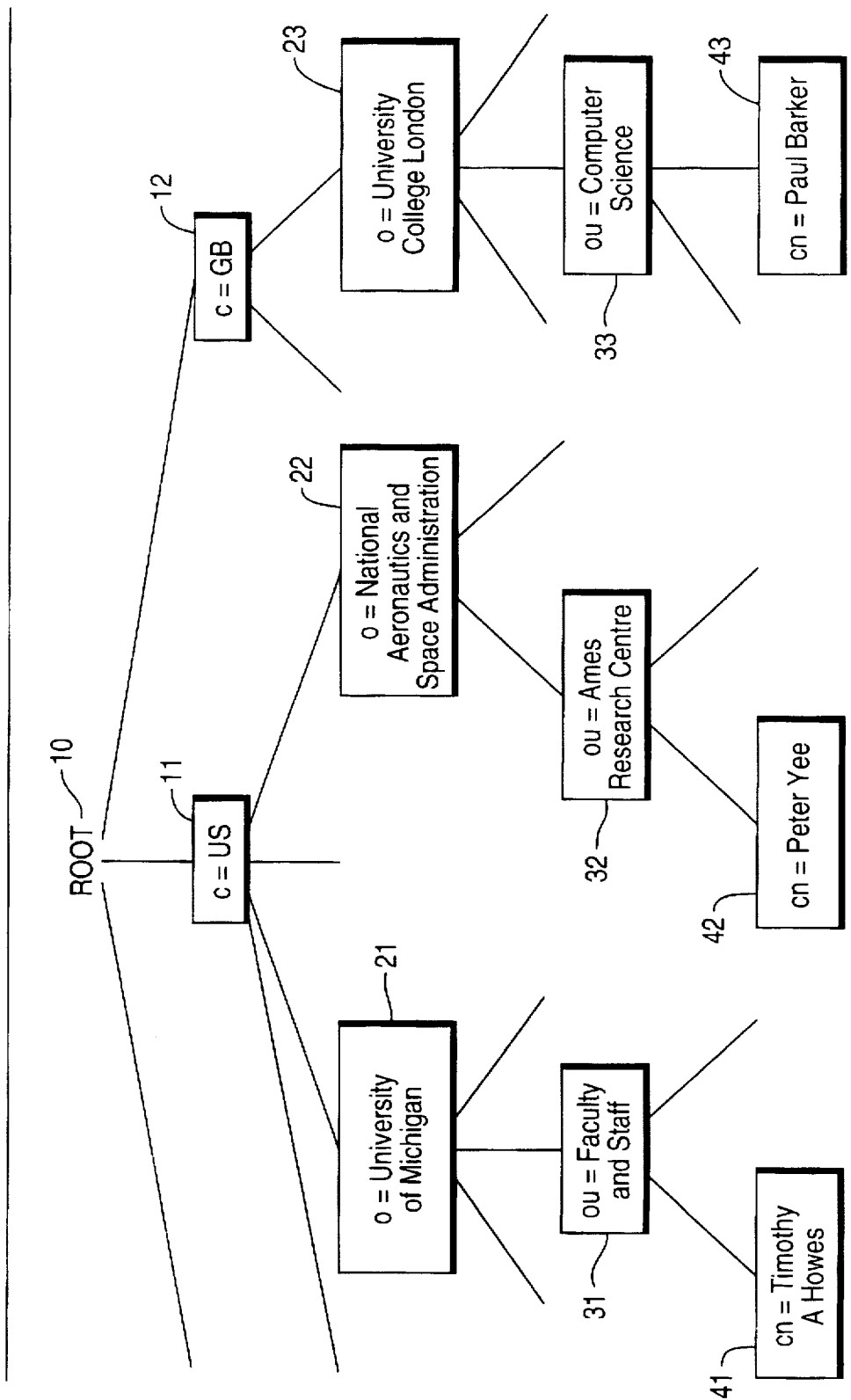
FIG. 13 illustrates a conventional directory information tree.

The interface further facilitates administration by providing user interfaces to manage the method and system. Interfaces to start, stop and query process status are displayed by specifying the "Process Control" option 605 of the main directory administration menu 604 illustrated in FIG. 6. The "Process Control" dialog box 1200 is depicted in FIG. 12. The various directory service agent processes configured are displayed in the "Process/Status" window 1201. The administrator can specify if this screen 1200 should be automatically updated by toggling the "Auto-Update" button 1202. The duration between updates is specified in the corresponding input field 1203. An additional "LDAP Status" toggle button 1204 is used to specify whether status of the LDAP daemon (element 105, FIG. 5) should be displayed in the "Process/Status" window 1201. The administrator specifies whether the QUIPU directory service agent and delegate directory service agent processes should be started when the operating system is rebooted by toggling the "Auto Start" button 1205. A particular process may be started or stopped by depressing the "Start" button 1206 and the "Stop" button 1207, respectively.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A directory service system for accessing information stored in an X.500 directory information tree, comprising:

a first directory service agent implemented on a server and coupled to receive a query from a directory user agent, the first directory service agent being provided to manage information in a root of the directory information tree;

a plurality of delegate directory service agents, implemented on the server and coupled to the first directory service agent, respectively managing a corresponding portion of the directory information tree beneath the root of the directory information tree, each delegate directory service agent receiving a chained request from the first directory service agent generated in response to the query from the directory user agent, a response to the chained request from said each delegate directory service agent being provided to the first directory service agent; and a graphical user interface facilitating configuration of the delegate directory service agents, including a delegate directory service agent installation window including facilities for defining an alias entry for a new delegate service agent, the alias entry to be managed by the first directory service agent and for defining a delegate subtree distinguished name for a delegate entry beneath the alias entry in the directory information tree, the delegate entry to be managed by the new delegate service agent.

2. A system as recited in claim 1, wherein the plurality of delegate directory service agents are implemented using a plurality of corresponding parallel processing units provided within a single server.

3. A system as recited in claim 2, wherein the server includes a main memory and wherein information managed by the first directory service agent resides in the main memory.

4. A system as recited in claim 1, wherein the first directory service agent comprises a QUIPU directory service agent.

5. A directory service system, comprising:

at least one directory user agent coupled to provide user access to the directory service; and a server coupled to the at least one directory user agent to provide access to a directory information tree in response to a user request for information, the server including:

a main memory;

a first directory service agent managing a root of the directory information tree in the main memory;

a plurality of delegate directory service agents respectively managing a branch of the directory information tree below the root of the directory information tree, each receiving a chained request from the first directory service agent in response to the user request for information to retrieve the information; and a graphical user interface facilitating configuration of the delegate directory service agents including a delegate directory service agent installation window including facilities for defining an alias entry for a new delegate service agent, the alias entry to be managed by the first directory service agent and for defining a delegate subtree distinguished name for a delegate entry beneath the alias entry in the directory information tree, the delegate entry to be managed by the new delegate service agent.

6. A system as recited in claim 5, wherein the server comprises a plurality of parallel processing units, each processing task associated with a corresponding one of the delegate directory service agents.

7. A system as recited in claim 5, wherein the at least one directory user agent includes a remote directory service agent.

8. A system as recited in claim 5, wherein the at least one directory user agent includes a directory user agent application coupled to the server via a directory access protocol resident in the server.

9. A system as recited in claim 5, wherein the server further includes a directory shell interface to the directory.

10. A directory service system for accessing information stored in an X.500 directory information tree, comprising:

a first directory service agent implemented on a server and coupled to receive a query from a directory user agent, the first directory service agent being provided to manage information in a root of the directory information tree;

a plurality of delegate directory service agents, implemented on the server and coupled to the first directory service agent, respectively managing a corresponding portion of the directory information tree beneath the root of the directory information tree, each delegate directory service agent receiving a chained request from the first directory service agent generated in response to the query from the directory user agent, a response to the chained request from said each delegate directory service agent being provided to the first directory service agent; and a graphical user interface facilitating configuration of the delegate directory service agents, including a process control window including facilities for displaying in process status for the delegate directory service agents, and starting and stopping the operation of one or more of the delegate directory service agents.

11. A system as recited in claim 10, wherein the plurality of delegate directory service agents are implemented using a plurality of corresponding parallel processing units provided within a single server.

12. A system as recited in claim 11, wherein the server includes a main memory and wherein information managed by the first directory service agent resides in the main memory.

13. A system as recited in claim 10, wherein the first directory service agent comprises a QUIPU directory service agent.

14. A directory service system, comprising:

at least one directory user agent coupled to provide user access to the directory service; and a server coupled to the at least one directory user agent to provide access to a directory information tree in response to a user request for information, the server including:

a main memory;

a first directory service agent managing a root of the directory information tree in the in memory;

a plurality of delegate directory service agents respectively managing a branch of the directory information tree below the root of the directory information tree, each receiving a chained request from the first directory service agent in response to the user request for information to retrieve the information; and a graphical user interface facilitating configuration of the delegate directory service agents including a process control window including facilities for displaying process status for the delegate directory service agents, and selectively starting and stopping the operation of one or more of the delegate directory service agents.

15. A system as recited in claim 14, wherein the server comprises a plurality of parallel processing units, each processing task associated with a corresponding one of the delegate directory service agents.

16. A system as recited in claim 14, wherein the at least one directory user agent includes a remote directory service agent.

17. A system as recited in claim 14, wherein the at least one directory user agent includes a directory user agent application coupled to the server via a directory access protocol resident in the server.

18. A system as recited in claim 14, wherein the server further includes a directory shell interface to the directory.

* * * * *